(12) United States Patent
Ricart et al.

(10) Patent No.: US 7,359,934 B1
(45) Date of Patent: *Apr. 15, 2008

(54) MULTIPLE STORAGE CLASS DISTRIBUTED NAMETAGS FOR LOCATING ITEMS IN A DISTRIBUTED COMPUTING SYSTEM

(75) Inventors: Glenn Ricart, Salt Lake City, UT (US); Carlos A Nevarez, Orem, UT (US)

(73) Assignee: Novell, Inc., Provo, UT (US)

( * ) Notice: Subject to any disclaimer, the term of this patent is extended or adjusted under 35 U.S.C. 154(b) by 726 days.

This patent is subject to a terminal disclaimer.

(21) Appl. No.: 10/324,186

(22) Filed: Dec. 19, 2002

Related U.S. Application Data

(63) Continuation of application No. 09/244,830, filed on Feb. 4, 1999, now Pat. No. 6,510,450.

(51) Int. Cl.
*G06F 15/16* (2006.01)
(52) U.S. Cl. ...................... 709/203; 709/219
(58) Field of Classification Search ............... 709/203, 709/219, 226–228, 217
See application file for complete search history.

(56) References Cited

U.S. PATENT DOCUMENTS

| | | | |
|---|---|---|---|
| 4,718,005 A | 1/1988 | Feigenbaum et al. | 709/222 |
| 5,224,205 A | 6/1993 | Dinkin et al. | 395/200 |
| 5,282,244 A | 1/1994 | Fuller et al. | 379/230 |
| 5,377,323 A | 12/1994 | Vasudevan | 709/226 |
| 5,388,213 A | 2/1995 | Oppenheimer et al. | 709/245 |
| 5,408,619 A | 4/1995 | Oran | 395/325 |
| 5,434,974 A | 7/1995 | Loucks et al. | 395/200 |
| 5,437,029 A | 7/1995 | Sinha | 395/600 |
| 5,557,785 A | 9/1996 | Lacquit et al. | 707/104.1 |
| 5,628,007 A | 5/1997 | Nevarez | 395/612 |
| 5,649,200 A | 7/1997 | Leblang et al. | 717/3 |

(Continued)

OTHER PUBLICATIONS

Andrew S. Tanenbaum, "Distributed Operating Systems," 1995, pp. 246-252.

(Continued)

*Primary Examiner*—Nathan Flynn
*Assistant Examiner*—Mohammad Siddiqi
(74) *Attorney, Agent, or Firm*—Marger Johnson & McCollom PC

(57) ABSTRACT

Methods, signals, devices, and systems are provided for locating and retrieving files, objects, and other items in a network. Nametags are distributed through the network with the items. Each nametag may hold logical names identifying the item, names of the volatile copies of the item, and/or names of nonvolatile copies of the item. Thus, nametags may include names from multiple name spaces, and cached items can be identified expressly.

15 Claims, 5 Drawing Sheets

U.S. PATENT DOCUMENTS

| | | | |
|---|---|---|---|
| 5,729,689 A | 3/1998 | Allard et al. | 395/200.58 |
| 5,745,683 A | 4/1998 | Lee et al. | 395/200.8 |
| 5,794,232 A | 8/1998 | Mahlum et al. | 707/3 |
| 5,819,044 A | 10/1998 | Kawabe et al. | 395/200.56 |
| 5,832,487 A | 11/1998 | Olds et al. | 707/10 |
| 5,944,793 A | 8/1999 | Islam et al. | 709/220 |
| 6,014,667 A | 1/2000 | Jenkins et al. | 707/10 |
| 6,044,372 A | 3/2000 | Rothfus et al. | 707/10 |
| 6,101,541 A | 8/2000 | Ellesson et al. | 709/225 |
| 6,105,039 A | 8/2000 | Douceur et al. | 707/201 |
| 6,134,583 A | 10/2000 | Herriot | 709/17 |
| 6,510,450 B1* | 1/2003 | Ricart et al. | 709/203 |
| 6,681,282 B1* | 1/2004 | Golden et al. | 710/302 |
| 6,772,274 B1* | 8/2004 | Estakhri | 711/103 |
| 6,970,891 B1* | 11/2005 | Deo et al. | 707/205 |
| 6,990,666 B2* | 1/2006 | Hirschfeld et al. | 718/104 |
| 7,020,254 B2* | 3/2006 | Phillips | 379/114.04 |

OTHER PUBLICATIONS

"The AFS File System," May 1, 1996, pp. 1-6.
"22C: 116, Lecture 27," Spring 1997, pp. 1-6.
Doug Bierer, et al., "NetWare 4 for Professionals," 1993, pp. 306, 345-355, 407-422, 431, 432, 445-453, 508, 509, 684-687.
Mic Bowman, et al., "Reasoning About Naming Systems," 1993.
Mark Day, et al., "References to Remote Mobile Objects in Thor," 1993.
"The Handle System," CNRI, Jun. 20, 1996.

* cited by examiner

MULTIPLE STORAGE CLASS DISTRIBUTED NAMETAGS FOR LOCATING ITEMS IN A DISTRIBUTED COMPUTING SYSTEM

RELATED APPLICATION DATA

This application is a continuation of commonly assigned U.S. patent application Ser. No. 09/244,830, filed Feb. 4, 1999, now U.S. Pat. No. 6,510,450, issued Jan. 21, 2003, which is hereby incorporated by reference.

FIELD OF THE INVENTION

The present invention relates to name services, distributed directories, and other named item location tools for use in a distributed computing system. More particularly, the present invention relates to nametags which are distributed with files, with objects, or with other items, and which are used to correlate location-independent logical names with the location of item copies stored in the distributed system.

TECHNICAL BACKGROUND OF THE INVENTION

Distributed computing systems are becoming increasingly useful and prevalent. Distributed computers are connected by local area networks, wide area networks, and networks of networks, such as the Internet. These distributed computing systems make available platform-neutral, mobile code environments which contain a growing collection of computational objects, applications, data, and other information in the form of files and/or other named resources.

With the growth of such distributed computing systems and their information content, there is an urgent need to support name services that work across heterogeneous systems, services, and platforms. Powerful and convenient name services are needed to achieve seamless distribution of critical computations, and to make the power of such systems available for more widespread use. Name services help users (both human and digital) locate resources. Names can be used by services that enable end-user application programs and by system services to navigate, locate, access, and manipulate mappings between names and specific pieces of digital information such as a file or an object, or between names and specific pieces of equipment such as a printer or a disk array.

Mappings between names and specific resources are called bindings. By properly maintaining and using the bindings, a name service ideally allows users to consistently identify and access the named resources, and to do so without particular regard to the actual location of a copy of the resource. For example, a programmer should be able to invoke a name service interface with the name of a particular resource, and if a copy of the resource exists and can be found, a suitable reference to the copy should be returned. The action of obtaining the location of the actual resource by using the binding is known as name resolution.

For instance, a name service described in U.S. Pat. No. 5,819,044 uses a virtual resource management table having three sorts of fields: name, position, and procedure. For a given virtual resource, the management table creates a correspondence between the virtual resource's name, the position of an actual resource, and the name of a procedure to handle the actual resource. Name resolution is carried out by using a name as a key into the management table to obtain the position of the corresponding actual resource and the procedure name. Access to the resource then becomes possible.

Name bindings are generally used and understood in a particular context, which is defined by the name service and/or name space(s) involved. A name space may be implemented by syntax conventions and/or by a table that maintains the bindings which are used to resolve references to resources within the name space. In some cases the name space is limited to a single machine. But in other cases it can span multiple machines, as with Novell Directory Services or the CORBA Trader Service. Other examples of name spaces are the Domain Name System ("DNS"), the Service Advertising Protocol ("SAP"), and, of course, the many different filesystems in use in various networks.

A distributed computing system may contain multiple name spaces, such as low level service advertising name spaces, or high-level directory service name spaces. If the distributed system's computational objects may be replicated and mobile, it is neither practical nor feasible to require that all names be maintained within a single name space. Accordingly, as the distributed system grows, additional name spaces may be formed in an ad hoc manner for immediate convenience to allow easier and more efficient ways to locate and access computational resources when performing particular tasks.

For example, filesystems assign files to stable permanent locations and give them names which are unique within the given filesystem. When multiple filesystems have been aggregated (as for instance with Transarc's AFS filesystem), the file name within the filesystem has been prepended with the name of the filesystem or the cell within which the file name was assigned. Therefore, one must know where the file is located, at least to some degree of precision, in order to find the file.

Regardless of whether multiple resource name spaces are in use, a distributed system may include multiple copies of a given resource. For instance, copies of files and objects may be stored in cache memory to reduce access times. Files and objects may also be replicated in nonvolatile storage to create copies on several computers in the system. This may be done to create copies on several servers and/or to create copies on mobile computers that disconnect from the system on occasion.

Sometimes one copy of a resource is preferable to another copy. A cached copy may be preferred over one which has not been cached, and a disk copy on a nearby server may be preferred to one on a distant server. A given copy may also be more recent or otherwise more authoritative than another copy. For instance, one copy may have been more recently updated by a user than another copy, and the two copies may not yet have been synchronized.

To summarize, a computational resource is referred to by one or more names which are input to name services. Name services resolve the name by looking it up in a table of name-to-address or name-to-reference bindings which are contained inside some name space. A resource may have more than one name within a given name space. A resource may also have several names in several name spaces or contexts. The distributed system may contain more than one copy of a resource, with differences between copies due to synchronization delays, retrieval delays, or both. Although existing name services are useful, they have drawbacks.

In particular, it would be an advancement in the art to provide an improved distributed computing system name service which resolves location-independent resource names even when several name spaces are being used in the distributed system.

It would be an additional advancement to provide such an improved name service which allows users to locate preferred copies of resources, such as files and objects which are stored in cache, which are stored locally, and/or which are the most current version available.

Such name service improvements are disclosed and claimed herein.

BRIEF SUMMARY OF THE INVENTION

In one embodiment, the present invention provides a name service which supports name resolution in a distributed computing system by distributing nametags with files, objects, and other items. Item names in the nametags lie in three name spaces, which together form a name system. The three name spaces, which correspond to three storage classes for items, are "nonvolatile", "volatile", and "logical", as explained below.

Nonvolatile item names are names of permanent or semi-permanent nonvolatile copies of the item. Nonvolatile item names locate full, authoritative copies of the information which are maintained with algorithms designed to keep them as consistent as is needed by the type of information being stored. Nonvolatile item names resolve to the particular file or object copy using familiar system lookup and finding mechanisms in combination with the nametags and name system of the present invention.

Volatile item names are names of temporary or cached copies of the item or portions of the item. Volatile item names provide rapid access to the information by identifying in-memory copies or copies saved on network nodes which are closer to the location where the information is needed. Volatile item names can be used to retrieve information quickly, but the assurance of finding the information is often lower than if a nonvolatile item name were used. A transparent cache may intercept requests for nonvolatile items which are locally cached and translate them to requests for local corresponding volatile items to allow retrieval through the cache.

Logical names do not, in themselves, reveal the actual location of information but can be resolved with nametags into nonvolatile item names and/or volatile item names which do contain location information. Several different logical name spaces may be organized by different principles, such as by author, chronology, logical file folder, and so on, so that items can be selected and retrieved according to user context. Each logical name entry in a nametag includes an indication of the name space in which the logical name is meaningful.

Each named item can have one or more instantiations of its nametag stored at various places in the network. Nametags may be contained in network-wide directories to help resolve logical names. A copy of a nametag is also kept with each copy of an item which is pointed to by a volatile item name and/or nonvolatile item name in the nametag.

The nametags are maintained by the name service to reflect changes in the status or existence of item copies. For instance, if an item is mobile, new permanent copies of the item (with new nonvolatile item names) may be created via replication for additional reliability, disconnected operation, or faster local processing. Permanent copies may become permanently unavailable because of a disk crash or a node decommissioning. In response to such events, nonvolatile names may be marked or flagged in the nametag to indicate that the item is no longer available. Copies may also become temporarily inaccessible due to network failures or disconnected operation, corresponding indications may be made for nonvolatile, volatile, and/or logical names of copies so affected. Nonvolatile copies may be downgraded to volatile storage when copies are plentiful and nonvolatile storage is dear. Volatile copies may proliferate when information is being actively used and disappear when accesses decline.

Using the nametags, the name service can resolve location-independent logical names even when several name spaces are being used in the distributed computing system. In addition, the nametags and name service allow users to locate preferred copies of files and objects which are stored in cache, which are stored locally, and/or which are the most current version available. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, signals, and devices for locating objects and files in a computer network or other distributed computing, system. In particular, the invention provides and uses novel nametags for associating logical names of an item with the names of cached copies of the item and the names of permanent copies of the item. Various components of the invention and its environment are discussed below.

Computers, and Networks Generally

Distributed computing systems which may be configured according to the invention include computer networks, both individually and in aggregations, as well as mobile computers which are connectable to such networks. By way of example, suitable computer networks include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof. The network may include one or more LANs, wide-area networks, Internet servers and clients, intranet servers and clients, or a combination thereof.

Figure 1:
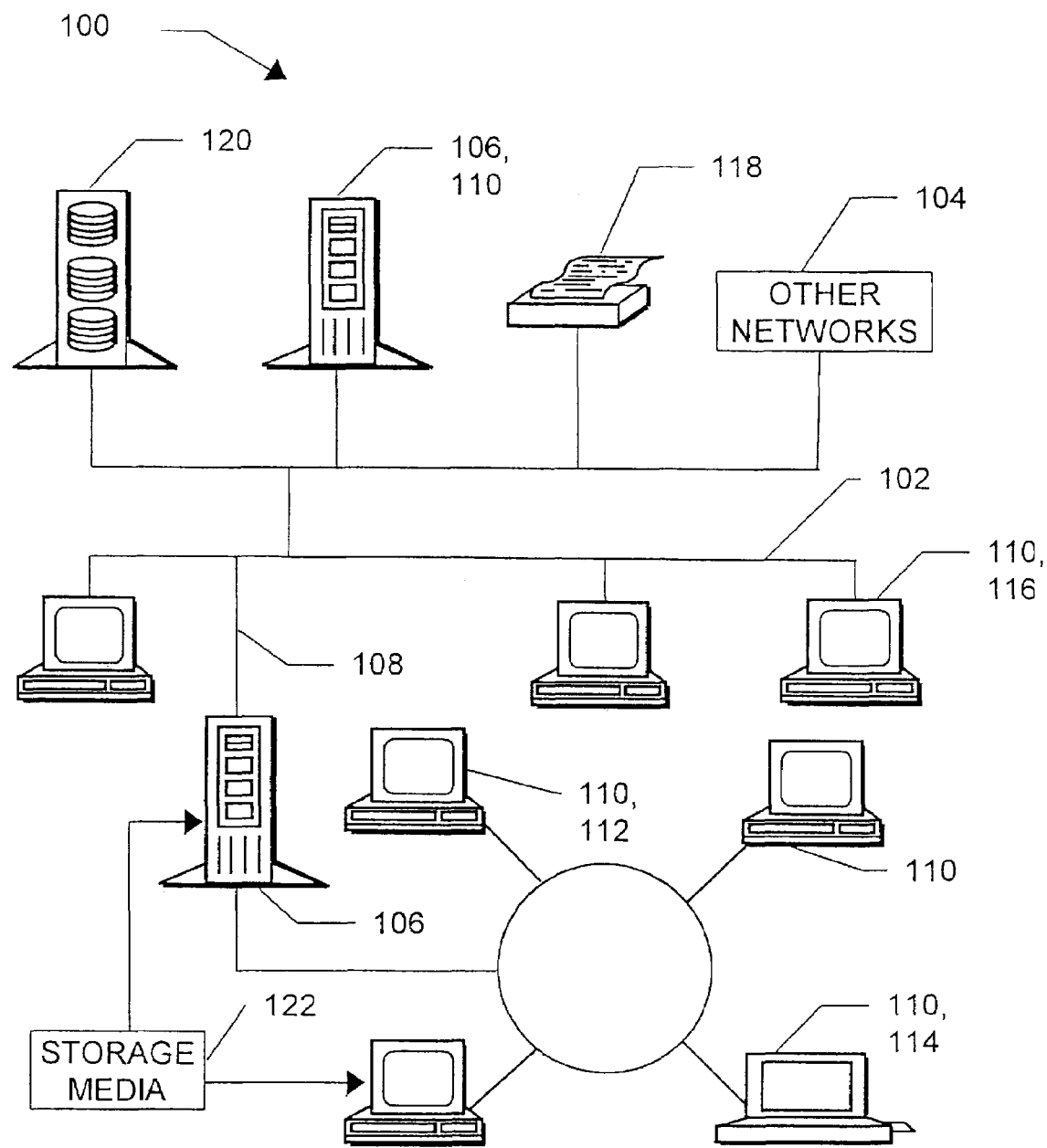
FIG. 1 is a diagram illustrating one of the many distributed computing systems suitable for use according to the present invention.

One of the many computer networks suited for use with the present invention is indicated generally at 100 in FIG. 1. In one embodiment, the system 100 includes Novell NetWare® network operating system software (NETWARE is a registered trademark of Novell, Inc.). In alternative embodiments, the system 100 includes NetWare Connect Services, VINES, Windows NT, Windows 95, Windows 2000, LAN Manager, or LANtastic network operating system software and/or an implementation of a distributed hierarchical partitioned object database according to the X.500 protocol such as Novell Directory Services or LDAP directory services (VINES is a trademark of Banyan Systems; NT, WINDOWS 95, WINDOWS 2000, and LAN MANAGER are trademarks of Microsoft Corporation; LANTASTIC is a trademark of Artisoft). The system 100 may include a local area network 102 which is connectable to other networks 104, including other LANs or portions of the Internet or an intranet, through a gateway or similar mechanism.

The system 100 includes several file or object servers 106 that are connected by network signal lines 108 to one or more network clients 110. The servers 106 and clients 110 may be configured by those of skill in the art in a wide variety of ways to operate according to the present invention. The servers 106 may be configured as Internet servers, as intranet servers, as directory service providers or name servers, as software component or other object servers, or as a combination thereof. The servers 106 may be uniprocessor or multiprocessor machines. The servers 106 and clients 110 each include an addressable storage medium such as random access memory and/or a nonvolatile storage medium such as a magnetic or optical disk.

Suitable network clients 110 include, without limitation, personal computers 112, laptops 114, workstations 116, dumb terminals, information appliances, personal digital assistants, and other handheld and/or embedded processing systems. The signal lines 108 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media (volatile and/or nonvolatile).

In addition to the network client computers 110, a printer 118 and an array of disks 120 are also attached to the particular system 100 shown, as examples of other network nodes or devices. A given computer may function both as a client 110 and as a server 106; this may occur, for instance, on computers running Microsoft Windows NT or Windows 2000 software. Although particular individual and network computer systems and components are shown, those of skill in the art will appreciate that the present invention also works with a variety of other networks and computers.

The servers 106 and the clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium 122 tangibly embodies a program, functions, and/or instructions that are executable by the servers 106 and/or network clients 110 to perform file and/or object tracking, location, and/or retrieval steps of the present invention substantially as described herein.

Files, Objects, and Items

The term "file" is used herein in the standard sense understood by those of skill in the computing arts. The term "object" as used herein refers to any collection of code, data, and/or data structure(s) which can be individually stored and retrieved by name in a computing system. Examples include, without limitation, Java applets and servlets; COM, DCOM, CORBA, and OLE components; and distributed database or directory service database objects and their attributes. A one-to-one correspondence is sometimes, but not always, present between given files and corresponding objects. The term "item" is used herein to describe files and objects collectively. A "copy" of an item is a copy of the item having the same content as other copies, up to replication or synchronization differences and caching differences. Different copies of an item may also have different names.

Name Services, Nametags

Figure 2:
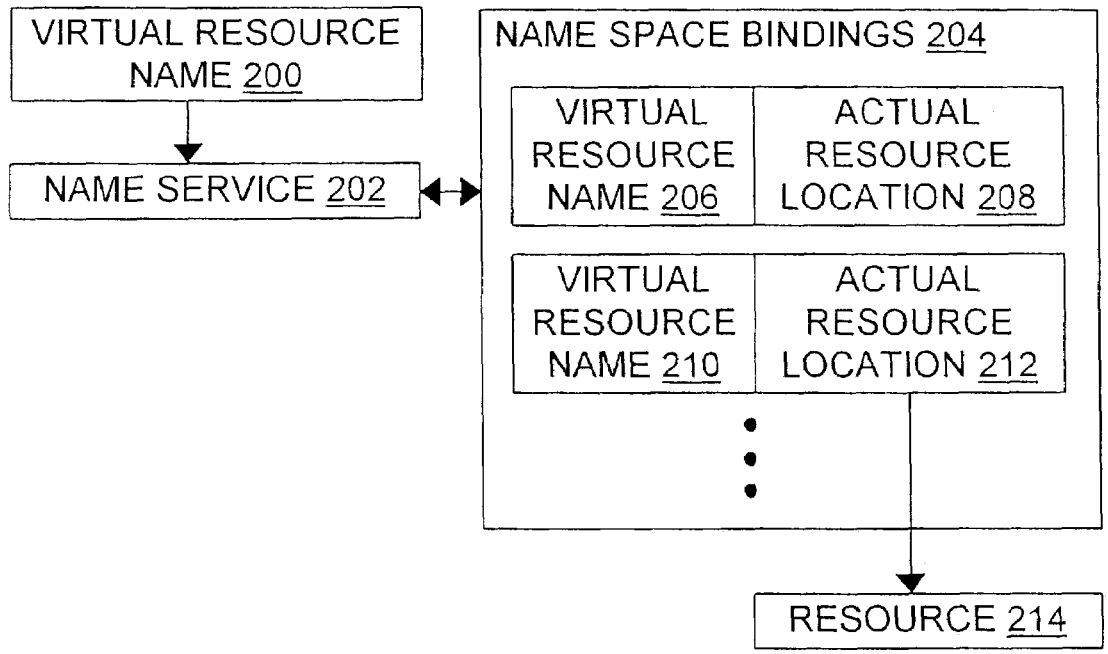
FIG. 2 is a diagram illustrating a conventional name service and conventional name bindings in a name space.
Figure 3:
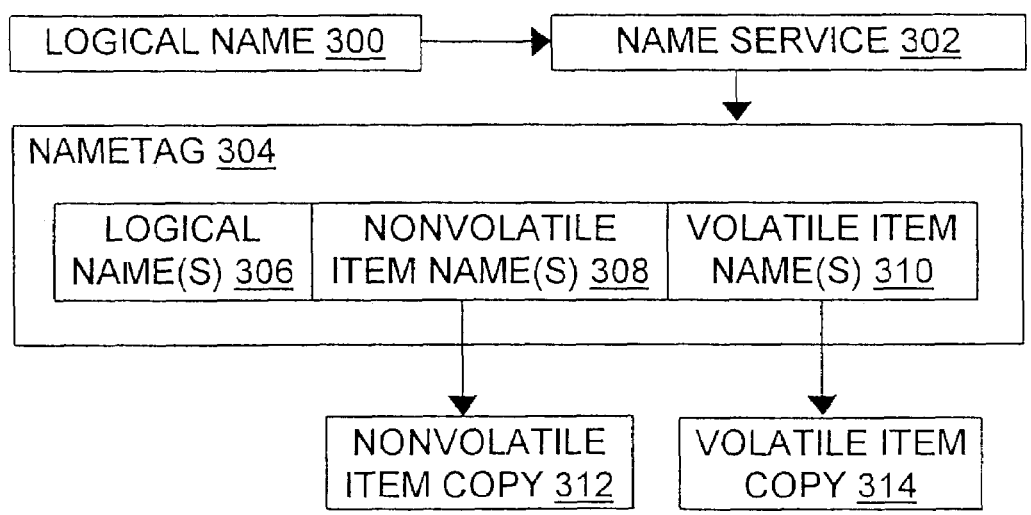
FIG. 3 is a diagram illustrating a novel name service and novel nametags supporting one or more name spaces according to the present invention.

FIG. 2 illustrates a conventional configuration using a name service, while FIG. 3 illustrates a contrasting configuration according to the present invention. In the conventional configuration, a virtual resource name 200 is provided to a name service 202 by an application program or other source. The virtual name 200 is location-independent. That is, the virtual name does not ordinarily reveal, in and of itself, enough information to locate a copy of the named resource.

The name service 202 looks up the virtual resource name 200 in a table of bindings 204. The table 204 includes pairs comprising a virtual resource name and a corresponding actual resource location. An "actual" resource is a digital copy of the resource. For example, a copy of the resource named by virtual resource name 206 can be located using the information in the location field 208, a copy of the resource named in field 210 can be located using field 212, and so on. In this manner the name service 202 locates an actual copy of the resource 214 to be used by the application program or other requester.

In this conventional system, actual resource locations such as the locations 208, 212 do not distinguish between volatile and nonvolatile copies of the resource. For instance, suppose the named location is a "full path name", that is, a server name plus a directory path plus a file name. The full path name will not indicate whether the file has been cached locally, has been cached remotely on the server, or must be read entirely from the server's disk.

Instead, a cache manager operates in a manner transparent to the name service 202 and the application program. The cache manager provides a cached copy if one is available and provides a copy from a slower source otherwise. The cache manager does not inform the name service 202 or the application program which type of copy is being provided and does not give them a chance to choose between cached and non-cached copies. Caching is discussed further in connection with FIGS. 4 and 5.

By contrast, FIG. 3 shows a logical name 300 being provided to a name service 302 according to the invention. The logical name 300 may be a virtual resource name 200 or another location-independent name denoting at least one item being sought by the application program or other requester. The multi-valued correspondences allowed by the present invention allow more than one logical name 300 to be associated with a given item, so an item may be known to users by more than one name if desired, or it may be known to different users by different names.

The name service 302 looks up the logical name 300 in a collection of one or more nametags 304. As illustrated, each nametag 304 includes a logical names component 306, a nonvolatile item names component 308, and a volatile item names component 310. Each component includes zero or more name entries 800 (see FIG. 8). Unlike the conventional approach illustrated in FIG. 2, the inventive approach shown in FIG. 3 distinguishes between volatile and nonvolatile copies of an item. As discussed in connection with FIG. 8, nametags may also contain other components or fields.

Each of the components 306, 308, 310 can contain zero or more names or other values of the type discussed here; to use the invention to best advantage, at least two names will be present. The logical names component 306 can contain logical names such as the logical name 300. The nonvolatile item names component 308 can contain filenames, full path names, universal resource locators, or other indications of the location of a nonvolatile copy 312 of the item named by the logical names component 306. The volatile item names component 310 can contain similar indications of the location of a volatile copy 314 of the item named by the logical names component 306.

Nonvolatile item names and volatile item names may also be placed in correspondence with one another within the nametag 304, even if no logical names are placed in that nametag. Likewise, several logical names may be associated with one another, even before a volatile or nonvolatile copy of the item is named in the nametag. However, each nametag 304 includes the components 306 through 310, or at least space to hold pointers to such components.

Caches

Figure 4:
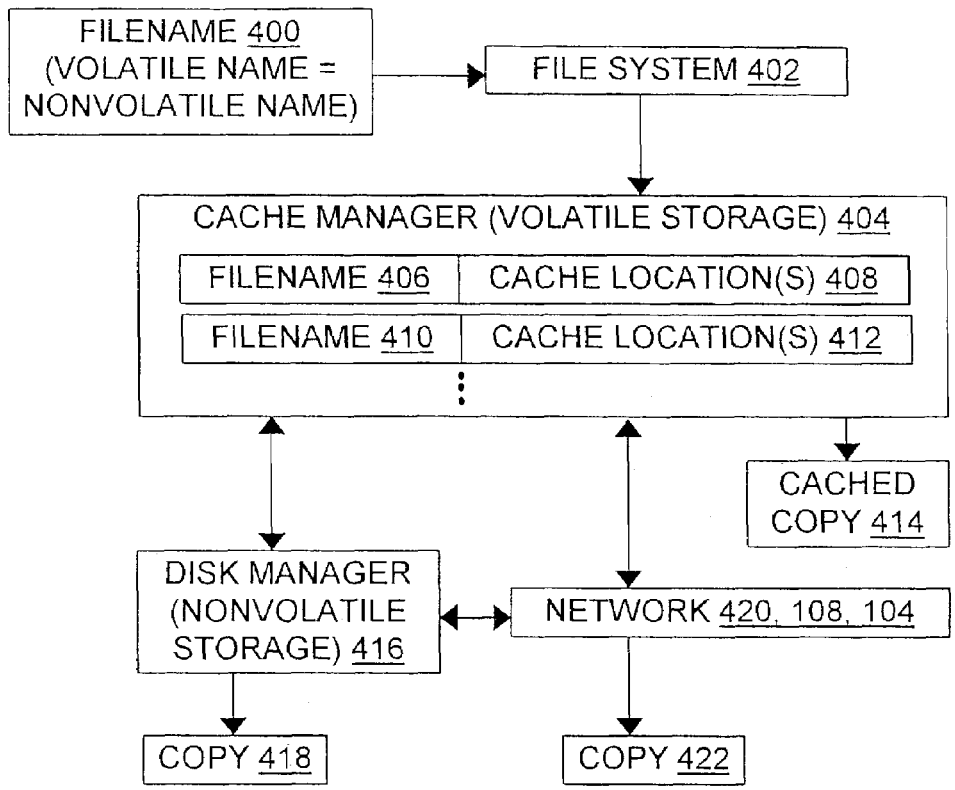
FIG. 4 is a diagram illustrating conventional location and retrieval of files using a cache.
Figure 5:
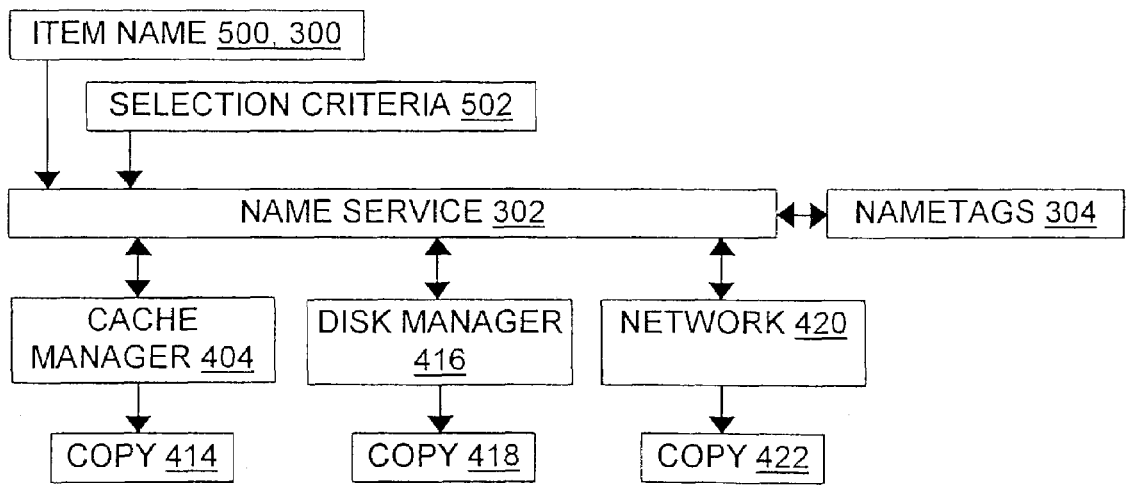
FIG. 5 is a diagram illustrating location and retrieval of items using a name service and nametags according to the present invention.

FIG. 4 illustrates a conventional configuration using a cache, while FIG. 5 illustrates use of a cache according to the present invention. As used herein, a "cache" is a storage medium intended to speed access to cached data by providing a copy of the data which is relatively fast to retrieve. For instance, a RAM cache makes a copy of data in RAM to avoid the delays incurred by disk I/O, and a local cache makes a local copy of data (in RAM and/or on disk) to avoid the delays incurred by network I/O.

In the conventional configuration, a filename 400 is presented to a filesystem 402. The filename 400 does not indicate whether the requested file is cached, but remains the same regardless of whether none, part, or all of the file has been cached. The filesystem 402 presents the filename 400 (or a corresponding handle or other identifier) to a cache manager 404. In the illustrated configuration, the cache manager 404 manages a RAM cache, but in other configurations the cache manager 404 manages a local disk cache instead of, or in addition to, the RAM cache.

The cache manager 404 maintains a table of filenames and cache locations. Thus, the file named in field 406 has contents cached at the locations identified in field 408, the file named in field 410 has contents cached at the locations identified in field 412, and so on. Cache locations may be identified by memory addresses, disk sector numbers, page numbers, or other familiar means.

If the cache manager 404 does not find the requested filename 400, then the cache manager 404 (or in some cases the filesystem 402) seeks a copy of the file from a source outside the cache. This may involve communications with a disk manager 416 to obtain a copy 418 stored on disk and/or network 420 transmissions to obtain a copy 422 stored on another network node such as a remote server 106, client 110, or shared disk 120.

FIG. 5 shows an item name 500 being provided to a name service 302 according to the invention. The item name 500 may be a logical name 300, a nonvolatile item name, or a volatile item name. Optionally, one or more selection criteria 502 are also provided to the name service 302. Selection criteria 502 may specify, for instance, a preference for the name of a RAM cached copy of the item, the name of a locally cached copy of the item, the name of the nearest copy of the item, a complete copy of any matching nametags stored locally, a complete copy of any matching nametags stored elsewhere, or other nametag, 304 and/or item copy data.

The name service 302 looks up the item name 500 in the collection of nametags 304. By default, the lookup is performed on local nametags 304 first, but remotely stored nametags 304 may also be searched in some embodiments. Familiar indexing and hashing tools and techniques may be used to optimize and/or implement the lookup.

Unlike the conventional approach illustrated in FIG. 4, the inventive approach shown in FIG. 5 distinguishes at least between volatile and nonvolatile copies of an item. Accordingly, the name service 302 obtains a volatile copy 414 from the cache manager 404, a nonvolatile copy 418 from the disk manager 416, and/or a copy 422 from over the network 420 as indicated by the nametags 304 (and possibly the selection criteria 502).

Item Location Methods

Figure 6:
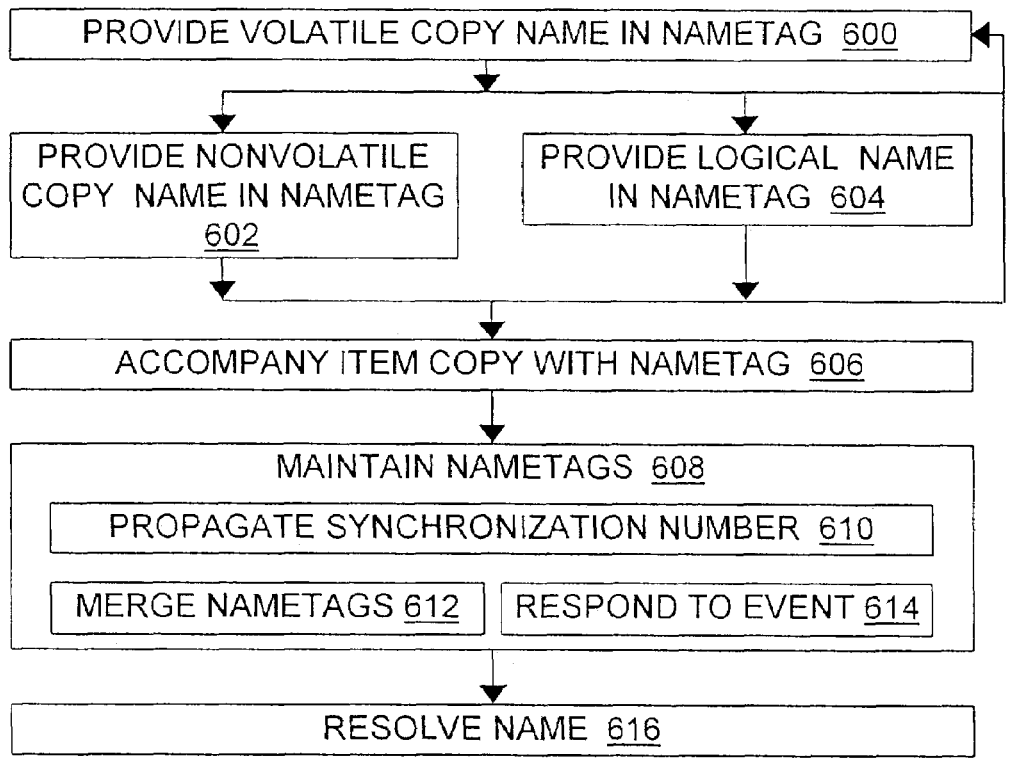
FIG. 6 is a flowchart illustrating methods of the present invention for maintaining nametags and a name service for locating items in a distributed computing system.

FIG. 6 illustrates methods of the present invention for using nametags 304 to locate items in the distributed computing system. During a step 600, zero or more volatile copies of an item are identified by providing their name(s) in a nametag 304. For instance, a system according to the invention may write a full path name in the volatile item names component 310 and set a flag indicating the item is cached. Alternatively, a full path name may be prepended by a cache identifier before being written to the component 310.

During a step 602, zero or more nonvolatile copies of the item are identified by providing their name(s) in the nonvolatile item names component 308 of the same nametag 304. Nonvolatile item names may use the same syntax as the volatile copy names, or they may use a different syntax and/or be in a different name space.

The volatile and nonvolatile names may be formed in part from any network-unique hierarchy method that allows the names to be mapped easily to the supporting filesystem(s). Part of a name may be chosen from the network address, Internet domain name, Universal Resource Locator (URL), or any other unique information that can be resolved to the correct network location. CPU serial number and/or network card serial numbers could be used if they are associated with particular network locations.

For updates and writes of synchronized items, such as objects in a distributed database like the Novell Directory Services database, nonvolatile item copy names should be used since these copies by definition are permanent and synchronize with each other. For high performance, writes may be done to volatile named copies with the understanding that the system will exert appropriate effort to later update the nonvolatile named copies.

During a step 604, zero or more logical names for the item are provided by writing them in the logical names component 306 of the same nametag 304. The step 602 and the step 604 may be performed in sequence or concurrently. More generally, steps according to the present invention may be performed in an order other than that shown, may be performed concurrently, may be repeated, may be omitted, and/or may be renamed or grouped differently than shown, provided they accomplish the claimed process.

Logical names may be created freely. For most applications, logical names will be most useful if they are unique. Uniqueness can be obtained by qualifying logical names with the identity of their creator. The creator of a given logical name then takes on the responsibility for uniqueness with respect to all other logical names created by that creator. For some applications, duplicate logical names may provide the network equivalent of an indexing or search capability. For example, if the author's name is used as one of an item's logical names, locating files based on that name will locate all files available to that person, or known locally to have been authored by that person.

During a step 606, nametag 304 copies are distributed with copies of the corresponding items. That is, copies of an item are always accompanied by the nametag 304 naming that copy. This may be accomplished in various ways. For instance, a copy of the nametags 304 for a given item may be placed in the header of a file containing the item's data, or it may be placed in a file whose name corresponds to the name of the file for the item but uses a different extension. Nametags 304 and their accompanying items may also be distributed by means of a distributed database such as the Novell Directory Services database.

During a step 608, nametags 304 are maintained in various ways to promote their continued usefulness. During a synchronization number propagating step 610, a synchronization number such as a timestamp or sequence number is propagated to nodes which hold copies of the nametags 304. During a subsequent merging step 612, nametags 304 which are located on different nodes in the network 100 are synchronized with one another. This tends to reduce, but does not necessarily eliminate, differences in the different copies of the nametag for a given logical name, for instance. During a step 614, a nametag maintainer (see FIG. 7) responds to events which change information that is reflected in the nametags 304. The various maintenance steps 610 through 614 are related to one another, but are not necessarily implemented in the same module.

For example, upon making a new volatile or nonvolatile copy of an item, a new name entry 800 (see FIG. 8) is added to the local nametag 304. The new entry may also be shared with other nodes and/or directories in a manner analogous to the way network routing information about new routes is updated in a network, such as by using link state algorithms.

Upon destroying a volatile or nonvolatile named copy of an item, the invalid date/time (field 808 in FIG. 8) is filled in to indicate that this copy is no longer available. Likewise, upon disconnection of a node, the temporarily inaccessible flag is set (field 810 in FIG. 8). Upon reconnection, the temporarily inaccessible flag may be optimistically reset.

Upon creation of a new logical name for a file or object, a new logical name entry 800 is made in the nametag 304. If the logical name is to be widely known throughout the network 100, it will be appropriate to send an update to all volatile and nonvolatile named copies and to all directories expected to contain the logical name.

In many cases, a nametag 304 will be received that refers to the same item as a nametag 304 already on hand. That is, one or more of the several names in the two nametag 304 copies match. In such a case, the nametag maintainer 716 on the node must merge information from the two nametags during step 612. If a name entry is valid in one copy of the nametag 304 and not present at all in the other copy, the name entry is added to both copies. If a name entry is valid in one copy and invalid in the other copy, the later date/time shows which entry to use in the merged nametag (the latest copy is used). If a name entry is invalid in one copy and not present at all in the other copy, the invalid entry is retained. If either nametag says the file is not accessible, the merged entry indicates that the file is not accessible.

In order to maintain nametags 304 properly, date or time or some other chronological value can be strongly synchronized throughout the system. The chronological value may be the actual date or time, or it may be a sequence number which is updated throughout the system. The propagation of monotonically increasing sequence numbers may be accomplished using Leslie Lamport's "Bakery Algorithm", for instance.

If a cache manager 404, filesystem, disk manager 416, or other system being accessed through a volatile or nonvolatile name says the item is no longer present, then the corresponding entry in the nametag 304 is marked invalid. After a nametag entry 800 has been invalid for a long period of time, that entry may be erased.

If a filesystem, cache manager 404, or other system named through a volatile or nonvolatile name cannot be reached, the inaccessible flag is set in the local nametag 304. This inaccessibility indication should usually not be propagated if there is any chance other systems will have a different access path to the item.

Entire nametags may be erased at will except in two cases. First, the nametags should not be erased if there is a corresponding named volatile or nonvolatile copy. Second, nametags should not be erased from a directory which is authoritative for the appropriate logical name space.

During a step 614, nametags 304 are used to resolve names. An item may be referenced using any of its names. That is, a logical name may resolve to another logical name, to a volatile copy name, to a nonvolatile copy name, or to some combination of such names. Likewise, a volatile name may resolve to a logical name, a nonvolatile copy name, another volatile copy name, or some combination. A nonvolatile name may likewise resolve to various types of names. Applications may generally use a logical name to allow the item to migrate through the network to whatever locations optimize network use and provide acceptable access time.

When an item is named to it, the name service 302 compares the name to the names listed in all of the nametags 304 in its name space. If a match is found, the nametag 304 in question provides alternate volatile and nonvolatile names, and the node may access the item through the nearest or best copy of all those listed. Even if the name given is a name which is no longer valid, the nametag 304 will help substitute a valid volatile or nonvolatile name so that the nearest or best copy can be accessed.

If no match is found, two options are available. First, if the name provided to the name service 302 as input from the user is a volatile or nonvolatile name, then the name provided already resolves to a particular computer, name system, and object using conventional mechanisms like URLs (Universal Resource Locators), DNS (Internet Domain Name Service) lookups, or AFS (Advanced Filesystem) finding. Accordingly, the request can be passed by the name service 302 to that computer and system.

Second, if the name is a volatile name, a nonvolatile name, or a logical name, then a network directory may be consulted. The network directory, which may be distributed, is a compendium of nametags 304. Each local copy of the directory may either be complete or it may be a subset. A complete directory contains all nametags 304 which include at least one logical name, while a subset directory contains all nametags which include some well-defined subset of a logical name space. For instance, the subset may be defined as a subtree in a hierarchical directory organization.

Example System

Figure 7:
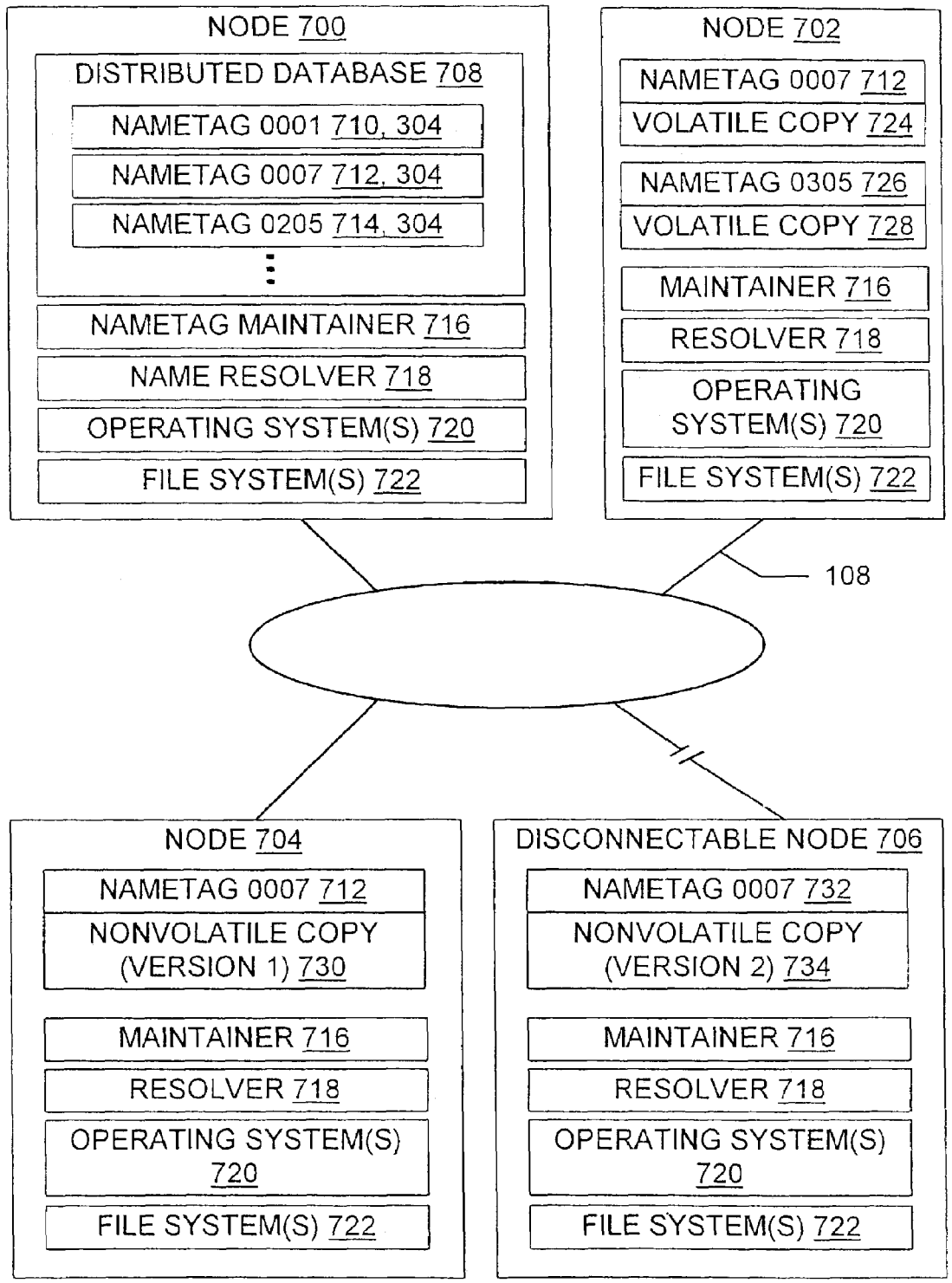
FIG. 7 is a diagram illustrating a portion of a distributed computing system according to the present invention, including a disconnectable node and other features.

FIG. 7 further illustrates a system according to the invention. For clarity of illustration, only four nodes 700,702,704, and 706 are shown; other embodiments may of course include more or fewer nodes. The node 700 includes a distributed database 708, which includes three nametags 710, 712, and 714. The distributed database 708 may be a directory services database such as Novell Directory Services database, an LDAP database, or the like. Each of the four nodes includes a nametag maintainer 716, a name resolver 718, at least one operating system 720, and at least one filesystem 722.

The nametag maintainer 716 helps maintain the information within the nametags by performing the maintenance step 608, for instance. The name resolver 718 helps users utilize the nametags by performing the resolving step 614, for instance. The components 716 and 718 may be implemented by those of skill in the art using familiar programming tools and techniques and/or familiar computer hardware in light of the teachings herein. Suitable operating systems 720 include both those intended for use primarily on single user workstations, and those intended for use in a networked environment. The same holds true of suitable filesystems 722.

To illustrate a situation in which nametags 304 are distributed with copies of the items, node 702 shows two nametags 712 and 726, respectively, which accompany their respective volatile copies 724 and 728 of the item. In addition, nodes 704 and 706 each contain an instance of the nametag which accompanies a nonvolatile copy 730 of the item. The volatile copy 724 and the nonvolatile copy 730 are identical with one another, up to differences resulting from caching. The nonvolatile copies 730 and 734 are identical with one another, up to differences resulting from updates not yet resolved through synchronization. The nametag copies 712 on nodes 702 and 704 are identical, having been recently merged. The corresponding nametag copy 732 on the disconnected node 706 differs from the two copies 712 because of events which occurred after the disconnection, but is otherwise the "same" nametag. Although the illustration shows a volatile copy 724 on one node and a nonvolatile copy 730 on a different node, in other situations volatile and nonvolatile copies may be stored on the same node.

As noted, node 706 is a disconnectable node. For instance, the node 706 may be a laptop computer which is sometimes connected to the network 100, and sometimes is not. Accordingly, the version of an item 734 on the node 706 may frequently differ from the version of that "same" item 730 on another node. Such differences may be resolved by transaction synchronization steps of the type used in distributed databases.

Nametag Signal Formats

Figure 8:
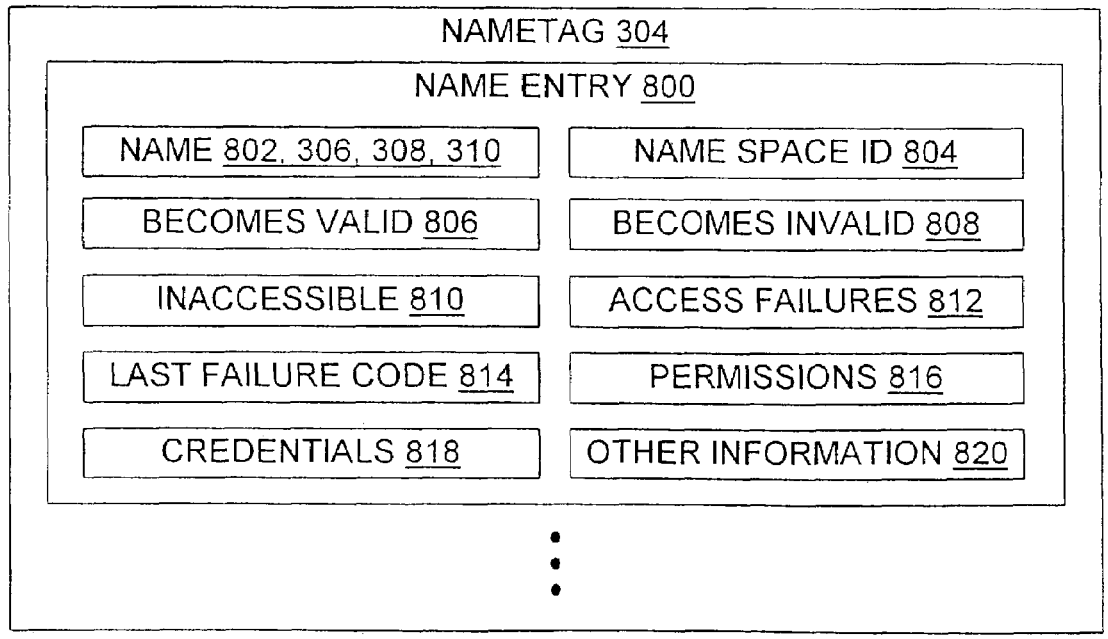
FIG. 8 is a diagram further illustrating possible components of a nametag according to the present invention.

FIG. 8 illustrates possible formats for a nametag 304 according to the invention. Although nametag fields are depicted in particular positions, those of skill in the art will appreciate that a wide variety of data structure field orderings, data sizes, and data encodings, and other variations are possible. The nametags 304 may also be embodied in the system in various media. For instance, they may take the form of data structures stored on a disk or in RAM memory, or the form of signals on network communication lines 108. Some embodiments will include all illustrated fields, while others omit fields and/or supplement the fields shown with other information. However, the distinctive features of the invention, as set forth in the appended claims, will be apparent in each embodiment to those of skill in the art.

The nametag 304 includes one or more named entries 800. Each named entry 800 corresponds to a given logical name, volatile item name, or nonvolatile item name. Thus, a nametag 304 which associates a logical name with a volatile item name and also with a nonvolatile item name will contain least three name entries 800. The names are placed in a name field 802 in the respective entries 800, using a name syntax which may vary according to the embodiment.

A name space identification field 804 may be used to identify the name space in which the name listed in field 802 resides. Alternatively, a prefix, suffix, or other indicator within the name itself may be used to identify the name space. For instance, names beginning with "HTTP" are understood to reside within an URL name space. A pair of fields 806 and 808 indicate when the name in the name entry 800 becomes valid and becomes invalid, respectively. The field 810 indicates whether the named item is temporarily inaccessible, due to being disconnected from the network 100, for example. A field 812 keeps count of recent access failures. The field 814 contains a code identifying the reason for the most recent access failure. Access control fields, such as a permissions field 816 or a credentials field 818, may also be placed in a given name entry 800. In addition, the name entry 800 may include other information 820 such as a version number, vendor identification, data size(s), data quality indicator, or the like.

Summary

In the present invention, copies of a given item are located, synchronized, and replicated by using bindings called nametags that include names of different storage classes. Each nametag 304 has a list of the volatile names of the object, a list of the nonvolatile names of the object, and a list of the logical names of the item. The nametags 304 for an item may vary considerably over time. When high reliability is needed, the nonvolatile name list may be long. When copies of an item are accessed frequently, the volatile name list may be long. The logical name list may expand when different applications and/or users know the same item by different appellations.

Nametags 304 in different parts of the system may also differ, even for the same item. For example, if a new cache copy is made of part of a file, at first only the nametag 304 accompanying that cached item will have the new volatile item name in its list. As nametags 304 are shared and distributed, the new volatile item name will become better known. The nametag 304 also may contain information that identifies the particular name system(s) that will be used to resolve the names embedded within it. In some cases, the information can be derived from the actual content of the name, such as http, ftp, servlet, and so on. By co-locating copies of data with their own nametags, local access can be made to a data copy even if the name used does not explicitly specify the local copy.

In a conventional system, the result of a lookup operation is a reference to an object. By contrast, the inventive lookup operation can return a nametag 304 which contains lists of names of different storage classes. In addition to locating copies of an item, the system can determine the type of name used by a given item copy and can facilitate operations such as synchronization of mobile replicas for the item. It is up to the application or service, or even the end-user to determine which of the names contained in the nametag are the most appropriate for the particular use.

The nametag 304 can be administered by a nametag name service 302 that understands the semantics of the different name lists and provides the functionality needed to generate, maintain, and resolve nametags 304. Nametags 304 may also be generated when lookup operations are performed or as a result of a caching operation.

The present invention provide several advantages over conventional systems. For instance, local copies can be found without having to consult a centralized list of copies. Objects and files can be moved within the network to optimize network use by minimizing the use of congested links, by taking advantage of local storage, and so on, without having to change their logical names. Items can retain the same logical name no matter where copies of the item are stored in the network. Lookups do not always depend on a central directory, thereby improving scalability and reliability. Files and objects can also have multiple names within different name spaces.

Although particular methods (FIG. 6) and signal formats (FIG. 8) embodying the present invention are expressly illustrated and described herein, it will be appreciated that apparatus and article embodiments may be formed according to the signals and methods of the present invention. Unless otherwise expressly indicted, the description herein of methods and signals of the present invention therefore extends to corresponding apparatus and articles, and the description of apparatus and articles of the present invention extends likewise to corresponding methods and signals.

As used herein, terms such as "a" and "the" and item designations such as "field" are inclusive of one or more of the indicated item. In particular, in the claims a reference to an item means at least one such item is required. When exactly one item is intended, this document will state that requirement expressly.

The invention may be embodied in other specific forms without departing from its essential characteristics, including object databases which are only partially hierarchical, and object databases structured as undirected graphs or directed graphs. The described embodiments are to be considered in all respects only as illustrative and not restrictive. Headings are for convenience only. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for maintaining named item information in a distributed computing system, the method comprising the steps of:
   first identifying a volatile copy of an item by a first item name in a nametag;
   second identifying a non-volatile copy of the item by a second item name in the nametag; and
   third identifying a third copy of the item by a third item name in the nametag, the third copy of the item being one of a second volatile copy of the item and a second non-volatile copy of the item.

2. The method of claim 1, wherein any of the identifying steps identifies a file item.

3. A method according to claim 2, further comprising listing in the nametag a fourth item name for the file.

4. The method of claim 1, further comprising listing in the nametag a logical item name which does not in itself identify a specific copy of the item.

5. The method of claim 1, further comprising the step of accompanying at least one copy of the item with a nametag copy.

6. The method of claim 5, further comprising:
   listing in the nametag a logical item name which does not in itself identify a specific copy of the item; and
   resolving the logical name by using the nametag copy to locate at least one copy of the item in response to an application program request.

7. The method of claim 5, further comprising the step of synchronizing two nametag copies.

8. The method of claim 1, further comprising the step of accompanying at least one copy of the item with a nametag copy.

9. The method of claim 8, wherein the accompanying step places the nametag copy in storage associated with at least part of the item copy.

10. A configured computer storage medium having a configuration that represents data and instructions which will cause performance of method steps for maintaining item location information in a distributed computing system, the method comprising the steps of:
    providing in a nametag a volatile copy item name field for identifying a volatile copy of an item;
    providing in the nametag a nonvolatile copy item name field for identifying a nonvolatile copy of the item;
    providing in the nametag an additional item name for identifying one of a second volatile copy of the item and a second nonvolatile copy of the item; and
    providing in the nametag a logical item name field containing a logical name of the item, wherein the logical name does not in itself identify a copy of the item.

11. The configured storage medium of claim 10, wherein the method further comprises the step of accompanying at least one copy of the item with a nametag copy.

12. The configured storage medium of claim 11, wherein the method further comprises the step of resolving the logical name by using the nametag copy to locate at least one copy of the item.

13. The configured storage medium of claim 11, wherein the method further comprises the step of merging two nametag copies.

14. A method for maintaining named item information in a distributed computing system, the method comprising the steps of:
    first identifying a first non-volatile copy of an item by a first item name in the nametag;
    second identifying a second non-volatile copy of the item by a second item name in the nametag;
    third identifying a volatile copy of the item by a third item name in a nametag; and
    using the nametag to synchronize an update to one of the copies of the item to the other copies of the item.

15. A method according to claim 14, wherein using the nametag includes using the nametag to synchronize an update to the volatile copy of the item to the first non-volatile copy of the item and the second non-volatile copy of the item.

* * * * *